United States Patent [19]

Fairbairn

[11] 3,906,194

[45] Sept. 16, 1975

[54] SIGNAL PROCESSOR

[75] Inventor: Douglas G. Fairbairn, Cupertino, Calif.

[73] Assignee: Xerox Corporation, Stamford, Conn.

[22] Filed: Dec. 20, 1973

[21] Appl. No.: 426,849

[52] U.S. Cl...... 235/92 MP; 235/92 EV; 235/92 PS; 235/92 R; 340/347 P

[51] Int. Cl.[2] .......................................... H03K 21/30

[58] Field of Search....... 235/92 PS, 92 EV, 92 MP, 235/92 CV; 340/347 P

[56] References Cited

UNITED STATES PATENTS

| | | | |
|---|---|---|---|
| 3,571,932 | 3/1971 | Peddie | 340/347 P |
| 3,731,301 | 5/1973 | Davis | 340/347 P |
| 3,745,544 | 7/1973 | Giichiro Ono | 235/92 MP |
| 3,752,969 | 8/1973 | Kiffmeyer | 235/92 MP |
| 3,764,781 | 10/1973 | Kreithen et al. | 235/92 MP |

*Primary Examiner*—Joseph M. Thesz, Jr.
*Attorney, Agent, or Firm*—James J. Ralabate; Terry J. Anderson; John H. Chapman

[57] ABSTRACT

A processor for converting signals generated by a shaft encoder into two separate pulse trains. The state of the output of the encoder is loaded into a register, whose output is used as an address to a memory device. Control information is stored in the memory device in accordance with a predetermined relationship between given addresses and output signals to be generated from the memory device. Respective output signals are generated upon the memory device being accessed by a given address. In the preferred embodiment, two sets of such signals are generated by the use of two shaft encoders, orthogonal to one another within a display-oriented pointing device, for representing the Cartesian coordinates of motion of the pointing device. The state of the output of the additional shaft encoder is also loaded into the register, with an additional register connected to the output of this first register for providing additional address bits used in accessing the memory device. Two sets of output pulse trains are thereby generated from the memory device, each of which consists of two separate pulse trains. Such pulse trains are utilized to provide cursor control signals to a display monitor.

8 Claims, 3 Drawing Figures

SIGNAL PROCESSOR

BACKGROUND OF THE INVENTION

The invention relates to a processor for converting signals generated by a shaft encoder to binary data and, more particularly, to a processor which may convert the output signals from a display-oriented pointing device to binary data which may be utilized by a display monitor. U.S. patent application No. 426,847, filed on Dec. 20, 1973 and assigned to the assignee of the present invention, discloses the use of shaft encoders within a pointing device which may be used to control the movement of a cursor over a display on, for example, a cathode ray tube. Signals are generated from the shaft encoders which indicate the respective movement of transport wheels which are coupled to the transducer portions of the encoders. It is further desirable to convert these signals to binary form which may be utilized by a display monitor.

U.S. Pat. No. 3,670,324 discloses apparatus for producing two trains of output pulses in quadrature from the output signals of a shaft position encoder. The apparatus taught therein includes a signal processing circuit for sampling the output signals from the encoder for counting only during a short sampling period in each cycle of the output signals. The sampling period is determined by a signal from a clock source, and the clock source is used to synchronize the operation of the entire counting system. The output pulses from the processing circuit are counted by an up-down counting system which displays a digital number representing the shaft position together with a plus or minus sign to indicate the direction in which the shaft has been rotated. The apparatus taught therein, however, does not provide a degree of flexibility over features as resolution that is desirable for many applications.

It is thus an object of the present invention to provide a processor which may be used for many applications which require the conversion of the output of a shaft encoder to binary control signals.

It is a further object of the present invention to provide a processor which converts the output signals from two shaft encoders used in a pointing device to binary control signals which may be utilized to control the movement of a cursor over a display screen.

Other objects of the invention will be evident from the description hereinafter presented.

SUMMARY OF THE INVENTION

The invention provides a processor for converting signals generated by a shaft encoder into two separate pulse trains. The state of the output of the encoder is loaded into a register, whose output is used as an address to a memory device. Control information is stored in the memory device in accordance with the predetermined relationship between given addresses and output signals which are to be generated from the memory device. Respective output signals are generated upon the accessing of the memory device by a given address.

Another feature of the invention is that an additional register is connected to the output of this first register for receiving its output to provide additional address bits for accessing the memory device. Upon a new state of the input to the first register, then, the output of the second register combines an address representative of the old state with the address generated from the first register, representative of the new state, for accessing the memory device.

Yet another feature of the invention is the use of two shaft encoders, substantially orthogonal to one another within a display-oriented pointing device, for representing the Cartesian coordinates of motion of the pointing device. Two sets of signals are thereby generated which are representative of the respective states of the encoders. These states are loaded into the first register, with the additional register connected to the output of the first register for providing additional address bits for accessing the memory device. Control information is stored in the memory device in accordance with the predetermined relationship between the possible states determining the address and output signals which are to be generated from the memory device.

These and other features which are considered to be characteristic of this invention are set forth with particularity in the appended claims. The invention, as well as additional objects and advantages thereof, will best be understood from the following description when considered in conjunction with the accompanying drawings.

DESCRIPTION OF THE PREFERRED EMBODIMENT

Figure 1A:
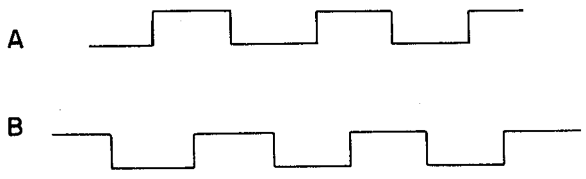
FIG. 1 is a diagram of the output signals generated by a shaft encoder in one direction (*a*) and in the opposite direction (*b*)
Figure 1B:
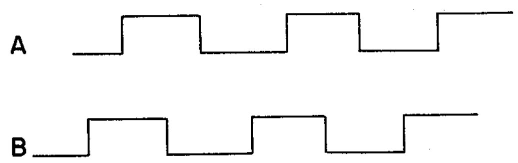

In FIG. 1 is shown the output signals or states of a shaft encoder which produces two pulse trains which are substantially square waves. In FIG. 1(*a*) the pulse trains are produced as the shaft of the encoder rotates in one direction and the pulse trains of FIG. 1(*b*) are produced by the rotation of the encoder's shaft in the opposite direction. These pulse trains are indicative of the signal envelope output from a shaft encoder taught in U.S. patent application No. 426,847, already identified herein. The respective pulse trains A and B of the encoder are 90° out of phase with one another. Depending upon the direction of rotation of the encoder shaft, one pulse train leads the other by this phase difference.

Figure 2:
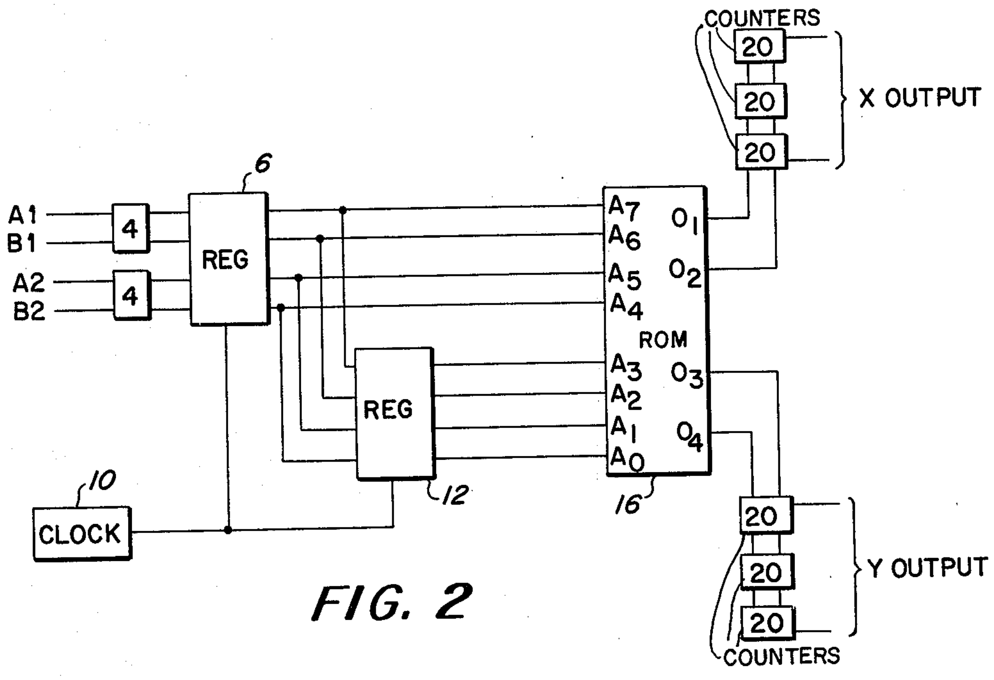
FIG. 2 is a schematic drawing of the processor which embodies features of the invention.

In FIG. 2 is shown a schematic drawing of the processor which embodies features of the invention. In this preferred embodiment, two sets (A1, B1, and A2, B2) of such signals as shown in FIG. 1 are generated by the use of two shaft encoders, orthogonal to one another within a display-oriented pointing device, for representing the Cartesian coordinates of motion of the pointing device, as taught in the above-identified U.S. patent application No. 426,847. The state of the encoder associated with the X coordinate of motion of the pointing device is represented by the signals A1 and B1. The encoder associated with the Y coordinate of motion of the pointing device is represented by the signals A2 and B2. These respective sets of signals are first processed by a respective amplifier shaper circuit 4, which may be a conventional level detector such as a Schmitt trigger circuit, for converting these output signals of the shaft encoders into two sets of pairs of square waves in quadrature. The output signals from the respective circuits 4 are loaded into a register 6 upon a clock pulse from a clock source 10.

The clock signal from the source 10 should be a regular pulse train with a frequency of at least eight times the maximum frequency appearing at A1, B1, A2, or B2. On each cycle of the clock signal, the present states of A1, B1, A2, and B2 are loaded into the register 6.

Another register 12 is connected to the output of the register 6 to receive the state of the register 6 as its input. Therefore, the state of the input lines A1, B1, A2, and B2 on the previous clock cycle is loaded into the register 12 at the same time that the new state of A1, B1, A2, and B2 is loaded into the register 6 on the next clock cycle. The outputs of the register 6 and 12 are used as address bits $A_0$–$A_7$ for accessing a read-only memory (ROM)16.

The registers 6 and 12 may be any suitable register element, such as register Model No. TI 74195 by Texas Instruments (T.I.). The ROM 16 is sufficiently large to store 256 four-bit words. This requirement would be fulfilled by a memory module designated as MD 6300 commercially available from Microsystems International, Ltd.

When neither A1, B1, A2, nor B2 have made a transition during the previous clock period, the corresponding outputs of the registers 6 and 12 are identical. Whenever the registers 6 and 12 are in an identical state, they address a word in the ROM 16 which has all zeros. If a transition in A1, B1, A2, or B2 has taken place in the last clock period, the outputs of the registers 6 and 12 will differ, thus providing a new address for accessing a unique location in the ROM 16. A cell within the ROM 16 which is one of those accessed by the new address will contain a ONE, indicative of the transition, which will appear on a corresponding output line of the ROM 16. The next clock pulse will again make the output of the registers 6 and 12 identical, assuming no new transitions. Thus, for one clock period, a pulse appears on one or two of the outputs of the ROM 16 representing the direction one or both of the shafts of the encoders may have rotated. Even if a change may have taken place on one of A1 or B1 and A2 or B2 during the same clock period, the change will be reflected at the output of the ROM 16.

The address input lines $A_0$–$A_7$ to the ROM 16 are related logically to the outputs $\mathbf{0}_1$–$\mathbf{0}_4$ of the ROM 16 in accordance with particular logic equations. These equations are:

$$O_1 = (A_5.A_4.\overline{A}_2.A_3) + (A_5.\overline{A}_4.A_2.A_3) + (\overline{A}_5.\overline{A}_4.A_2.\overline{A}_3) + (\overline{A}_5.A_4.\overline{A}_2.\overline{A}_3)$$

$$O_2 = (A_5.\overline{A}_4.\overline{A}_2.\overline{A}_3) + (A_5.A_4.A_2.\overline{A}_3) + (\overline{A}_5.A_4.A_2.A_3) + (\overline{A}_5.\overline{A}_4.\overline{A}_2.A_3)$$

$$O_3 = (A_7.A_6.\overline{A}_0.A_1) + (A_7.\overline{A}_6.A_0.A_1) + (\overline{A}_7.\overline{A}_6.A_0.\overline{A}_1) + (\overline{A}_7.A_6.\overline{A}_0.\overline{A}_1)$$

$$O_4 = (A_7.\overline{A}_6.\overline{A}_0.\overline{A}_1) + (A_7.A_6.A_0.\overline{A}_1) + (\overline{A}_7.A_6.A_0.A_1) + (\overline{A}_7.\overline{A}_6.\overline{A}_0.A_1)$$

The four signals $\mathbf{0}_1$, $\mathbf{0}_2$, $\mathbf{0}_3$ and $\mathbf{0}_4$ are respectively wired to up/down counters 20 as shown in FIG. 2. The counters 20 are arranged in two groups of three counters cascaded within each group to accommodate a particular resolution for the system. Each of the counters in the preferred embodiment are 4-bit counters such as a TI 74193 module by Texas Instruments (TI) or its equivalent, thereby allowing a 12-bit resolution respective to each group of counters. The signals appearing on the outputs $\mathbf{0}_1$ or $\mathbf{0}_2$ would be representative of the transitions indicative of the movement of the indicator device in the X direction, which transitions are counted by the respective counters 20. Similarly, the transitions appearing on the outputs $\mathbf{0}_3$ and $\mathbf{0}_4$ are counted by the respective counters 20 whose output is representative of the Y direction of movement of the indicator device. The X output and Y output from the counters 20, then, indicate in the form of binary signals the position of the indicator device.

Obviously, many modifications of the present invention are possible in light of the above teaching. It is therefore to be understood that, in the scope of the appended claims, the invention may be practiced other than as specifically described.

What is claimed is:

1. A processor for converting two sets of signals from a pair of shaft encoders, each set of which comprises a pair of signals approximately 90° out of phase with one another, into two binary pulse trains respective to each encoder, comprising:

first register means for storing the state of said encoder signals for a given period of time, said encoder signals respectively representing the X and Y positional coordinates of an indicator device, second register means responsive to the output of said first register means for storing its output state during the same period of time, clocking means connected to said first register means for loading the new state of said encoder signals into said first register means and for loading the output of said first register means representing the previous state of said encoder signals into said second register means each clock cycle, and memory means responsive to the output states of said first and second register means for processing said states, said memory means storing binary values which are accessed by the outputs of said register means whereupon said memory means is addressed in parallel by both the new and previous states of said encoder signals as represented by the outputs of said first and second register means to provide binary output signals in accordance with the binary values accessed indicative of the transitions in the states of said encoder signals, said binary signals being indicative of the position of said indicator device and capable of providing cursor control signals to a display monitor.

2. The processor of claim 1 wherein is further included counting means responsive to the output signals of said memory means for counting said transitions and providing binary signals indicative thereof.

3. The processor of claim 2 wherein the state of said encoder signals at any given instant of time are represented by four binary digits respective to each signal, wherein the previous state of said encoder signals is represented by $A_0$, $A_1$, $A_2$, and $A_3$ and the new state of said encoder signals is represented by $A_4$, $A_5$, $A_6$, and $A_7$ and where said memory means when addressed by $A_0$, $A_1$, $A_2$, $A_3$, $A_4$, $A_5$, $A_6$, and $A_7$ processes the adjacent states defined in accordance with the following logic equations which define the output signals $\mathbf{0}_1$, $\mathbf{0}_2$, $\mathbf{0}_3$, and $\mathbf{0}_4$ of said memory means:

$$O_1 = (A_5.A_4.\overline{A}_2.A_3) + (A_5.\overline{A}_4.A_2.A_3) + (\overline{A}_5.\overline{A}_4.A_2.\overline{A}_3) + (\overline{A}_5.A_4.\overline{A}_2.\overline{A}_3)$$

$$O_2 = (A_5.\overline{A}_4.\overline{A}_2.\overline{A}_3) + (A_5.A_4.A_2.\overline{A}_3) + (\overline{A}_5.A_4.A_2.A_3) + (\overline{A}_5.\overline{A}_4.\overline{A}_2.A_3)$$

–Continued $$O_3 = (A_7.A_6.\overline{A}_0.A_1) + (A_7.\overline{A}_6.A_0.A_1) + (\overline{A}_7.\overline{A}_6.A_0.\overline{A}_1) + (\overline{A}_7.A_6.\overline{A}_0.A_1)$$

$$O_4 = (A_7.\overline{A}_6.\overline{A}_0.\overline{A}_1) + (A_7.A_6A_0.\overline{A}_1) + (\overline{A}_7.A_6.A_0.A_1) + (\overline{A}_7.A_6.\overline{A}_0.A_1).$$

4. The processor of claim 3 wherein said memory means is a read-only memory.

5. A processor for converting two sets of signals from a pair of shaft encoders, each set of which comprises a pair of signals approximately 90° out of phase with one another, into two binary pulse trains respective to each encoder, comprising:

first register means for storing the state of said encoder signals for a given period of time, second register means responsive to the output of said first register means for storing its output state during the same period of time, clocking means connected to said first register means for loading the new state of said encoder signals into said first register means and for loading the output of said first register means representing the previous state of said encoder signals into said second register means each clock cycle, memory means responsive to the output states of said first and second register means for processing said states, said memory means storing binary values which are accessed by the outputs of said register means whereupon said memory means is addressed in parallel by both the new and previous states of said encoder signals as represented by the outputs of said first and second register means to provide binary output signals in accordance with the binary values accessed indicative of the transitions in the states of said encoder signals, the state of said encoder signals at any given instant of time being represented by four binary digits respective to each signal, the previous state of said encoder signals being represented by $A_0$, $A_1$, $A_2$, and $A_3$, and the new state of said encoder signals being represented by $A_4$, $A_5$, $A_6$, and $A_7$, and said memory means when addressed by $A_0$, $A_1$, $A_2$, $A_3$, $A_4$, $A_5$, $A_6$, and $A_7$ processes the adjacent states defined in accordance with the following logic equations which define the output signals $\mathbf{0}_1$, $\mathbf{0}_2$, $\mathbf{0}_3$, and $\mathbf{0}_4$ of said memory means:

$$O_1 = (A_5.A_4.\overline{A}_2.A_3) + (A_5.\overline{A}_4.A_2.A_3) + (\overline{A}_5.\overline{A}_4.A_2.\overline{A}_3) + (\overline{A}_5.A_4.\overline{A}_2.\overline{A}_3)$$

$$O_2 = (A_5.\overline{A}_4.\overline{A}_2.\overline{A}_3) + (A_5.A_4.A_2.\overline{A}_3) + (\overline{A}_5.A_4.A_2.A_3) + (\overline{A}_5.\overline{A}_4.\overline{A}_2.A_3)$$

$$O_3 = (A_7.A_6.\overline{A}_0.A_1) + (A_7.\overline{A}_6.A_0.A_1) + (\overline{A}_7.\overline{A}_6.A_0.\overline{A}_1) + (\overline{A}_7.A_6.\overline{A}_0.A_1)$$

$$O_4 = (A_7.\overline{A}_6.\overline{A}_0.\overline{A}_1) + (A_7.A_6.A_0.\overline{A}_1) + (\overline{A}_7.A_6.A_0.A_1) + (\overline{A}_7.A_6.\overline{A}_0.A_1).$$

6. The processor of claim 5 wherein the rotation of said shaft encoders represent respectively the X and Y positional coordinates of an indicator device and wherein said binary signals are indicative of the position of said indicator device.

7. The processor of claim 6 wherein is further included counting means responsive to the output signals of said memory means for counting said transitions and providing binary signals indicative thereof.

8. The processor of claim 7 wherein said memory means is a read-only memory.

* * * * *